United States Patent [19]
Wachtel et al.

[11] Patent Number: 5,939,728
[45] Date of Patent: *Aug. 17, 1999

[54] METHOD AND APPARATUS FOR READING PHOTO-STIMULATED LUMINESCENCE IMAGING PLATES

[76] Inventors: Jonathan Wachtel, 14 Palmach Street, 76 228 Rehovot; Yoel Fixler, 29 Aharoni Street, 76 282 Rehovot, both of Israel

[21] Appl. No.: 08/840,584

[22] Filed: Apr. 22, 1997

[51] Int. Cl.⁶ .......................... G03B 42/00; G01N 21/00
[52] U.S. Cl. .................... 250/586; 250/484.4; 250/216
[58] Field of Search .................... 250/586, 585, 250/587, 484.4, 216

[56] References Cited

U.S. PATENT DOCUMENTS

| | | |
|---|---|---|
| 3,859,527 | 1/1975 | Luckey . |
| 4,258,264 | 3/1981 | Kotera et al. . |
| 4,721,856 | 1/1988 | Saotome et al. . |
| 4,775,791 | 10/1988 | Owen et al. . |
| 4,886,968 | 12/1989 | Ohnishi et al. ......................... 250/586 |
| 5,081,357 | 1/1992 | Agano . |
| 5,124,558 | 6/1992 | Soltani et al. . |
| 5,124,913 | 6/1992 | Sezan et al. . |
| 5,138,161 | 8/1992 | Miyagawa et al. ...................... 250/588 |
| 5,142,557 | 8/1992 | Toker et al. . |
| 5,365,562 | 11/1994 | Toker . |
| 5,404,024 | 4/1995 | Namiki . |
| 5,637,867 | 6/1997 | Schröder et al. ......................... 250/586 |

OTHER PUBLICATIONS

S.A. Feig and M.J. Yaffe; Digital Mammography, Computer–Aided Diagnosis, and Telemammography, Radiologic Clinics of North America; vol. 33; No. 6; Nov. 1995; pp. 1025–1230.

J. Miyahara and K. Takahashi; A New Type of X–Ray Area Detector Utilizing Laser Stimulated Luminescence; Nuclear Instruments and Methods in Physics Research A246 (1986) 572–578.

Y. Amemiya et al; Design and Performance of Animaging Plate System for X–Ray Diffraction Study; Nuclear Instruments and Methods in Physics Research A266 (1988) 645–653.

H. Kato; Photostimulable Phosphor Radiography Design Considerations; Jul. 15–19, 1991; pp. 731–770.

*Primary Examiner*—Edward P. Westin
*Assistant Examiner*—Richard Hanig
*Attorney, Agent, or Firm*—Benjamin J. Barish

[57] ABSTRACT

A method and apparatus for reading a latent image stored in a photo-stimulated luminescence imaging plate by scanning the imaging plate with a focussed beam of light of a first wavelength to stimulate the stored image to emit light of a second wavelength; collecting the light emitted by the imaging plate; and directing the collected light to a light detector which converts the collected light to electrical signals. The light emitted by the imaging plate is collected by a non-imaging optical system which includes a dichroic mirror selectively directing light of the second wavelength to the light detector and light of the first wavelength away from the light detector.

44 Claims, 3 Drawing Sheets

METHOD AND APPARATUS FOR READING PHOTO-STIMULATED LUMINESCENCE IMAGING PLATES

FIELD AND BACKGROUND OF THE INVENTION

The present invention relates to a method and apparatus for reading imaging plates, particularly the latent image stored in a photo-stimulated luminescence imaging plate. The invention is particularly useful for reading X-ray mammograph imaging plates, and is therefore described below with respect to this application.

Photo-stimulated luminescence imaging plates are widely used in general X-ray radiographic examination systems. Such imaging plates can be used to conveniently produce a digitized image, thereby enabling the image to be stored, enhanced, or otherwise processed according to digital techniques. In addition, such imaging plates are reusable and thereby eliminate the need for using high cost photographic film. Moreover, they substantially reduce the time for analysing the results of the examination. Because of these advantages, they are increasingly replacing the use of photographic film.

When using such imaging plates, penetrating X-rays pass through the patient and are absorbed on the surface of the imaging plate. The imaging plate records the intensity of the radiation as a proportional density of trapped electrons. To read the imaging plate, it is illuminated with light of a first wavelength (e.g., red light) which liberates the trapped electrons. Upon returning to their original sites they emit light of a second wavelength (e.g., blue light). An optical collection apparatus transmits only the second (blue) wavelength light to a detector, typically a sensitive photomultiplier tube.

The first wavelength light (e.g., red light of long wavelength) used in the readout process is typically a narrow beam of laser light focussed to a spot on the imaging plate. The spot is swept over the area of the plate. The photomultiplier tube output signal is sampled by an A/D (analog-to-digital) converter circuit at intervals which determine the pixel size of the digitally stored picture. In general, the laser beam is scanned rapidly along one coordinate, while the imaging plate is moved slowly along the other coordinate to cover the whole area. However, the imaging plate may be moved rapidly, and the scanning beam may be moved slowly. The imaging plate is erased by overall exposure to the longer wavelength (red) light and may be reused.

Sensitivity, contrast, and spatial resolution in photo-stimulated luminescence imaging depend upon the characteristics of both the imaging plate and the reader. In mammography, it is important to detect small X-ray absorbing features such as calcifications, and to detect larger masses having X-ray absorption that differs only slightly from background fatty tissue. Imaging plate materials that are capable of meeting the stringent requirements of mammography are available. However, the deficiencies of the present art of imaging plate readers have prevented use of imaging plates in mammography.

Imaging plate systems, and particularly the readers used in such systems, are described in a number of publications, including: Y. Amemiya, et al., *Nuclear Instruments and Methods in Physics Research*, A266 (1988) pp. 645–653; and H. Kato, *Photostimulable Phosphor Radiography Design Considerations*, in American Association of Physicists in Medicine, Medical Physics Monograph No. 20 (1991) pp. 731–770. Such systems and/or readers are also described in a number of patents, including: U.S. Pat. Nos. 3,859,527, 4,258,264, 4,721,856, 4,775,791, 5,081,357, 5,124,558, 5,124,913, 5,142,557, 5,365,562, 5,404,024. While some of the foregoing patents describe readers for reading X-ray mammograph imaging plates, insofar as we are aware none has yet found widespread use in X-ray mammography because of the very stringent requirements for this use of imaging plates.

OBJECTS BRIEF SUMMARY OF THE INVENTION

An object of the present invention is to provide a method and also an apparatus for reading imaging plates which meet, or at least more closely approach, the high sensitivity, contrast, and/or spatial resolution requirements of X-ray mammography, as compared to the previously-known readers.

According to one aspect of the present invention, there is provided a method of reading a latent image stored in a photo-stimulated luminescence imaging plate by: scanning the imaging plate with a focussed beam of light of a first wavelength to stimulate the stored image to emit light of a second wavelength; collecting the light emitted by the imaging plate; and directing the collected light to a light detector which converts the collected light to electrical signals; characterized in that the emitted light is collected by a non-imaging optical system which includes a dichroic mirror selectively directing light of the second wavelength to the light detector and light of the first wavelength away from the light detector. The non-imaging optical system further includes a light collecting mirror between the imaging plate and the dichroic mirror, the light collecting mirror having: an entrance aperture sufficiently close to the imaging plate to collect substantially all the light emitted therefrom; an outlet window for outletting the collected light via the dichroic mirror to the light detector; a light inlet opening for directing the focussed scanning light beam onto the imaging plate at a predetermined angle of incidence; a light dump opening at a predetermined angle of reflection equal to the angle of incidence leading to a dump cavity for receiving and absorbing specularly reflected light from the imaging plate; and an inner surface reflecting to the output window light of the second wavelength emitted from the imaging plate.

According to another aspect of the present invention, there is provided apparatus for reading a latent image stored in a photo-stimulated luminescence imaging plate including: a beam scanner for scanning the imaging plate with a focussed beam of light of a first wavelength to stimulate the stored image to emit light of a second wavelength; a light collector for collecting the light emitted by the imaging plate; and a light detector for receiving and converting the collected light to electrical signals; characterized in that the light collector includes a non-imaging optical system which includes a dichroic mirror selectively directing light of the second wavelength to the light detector and light of the first wavelength away from the light detector. The non-imaging optical system is constructed with the combination of features set forth above.

As will be more fully described below, such features of the invention, as well as additional features to be described below, enable imaging plates to be read in a manner providing high sensitivity, contrast and spatial resolution such as to enable the photo-stimulated luminescence imaging technique also to be used in X-ray mammography.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
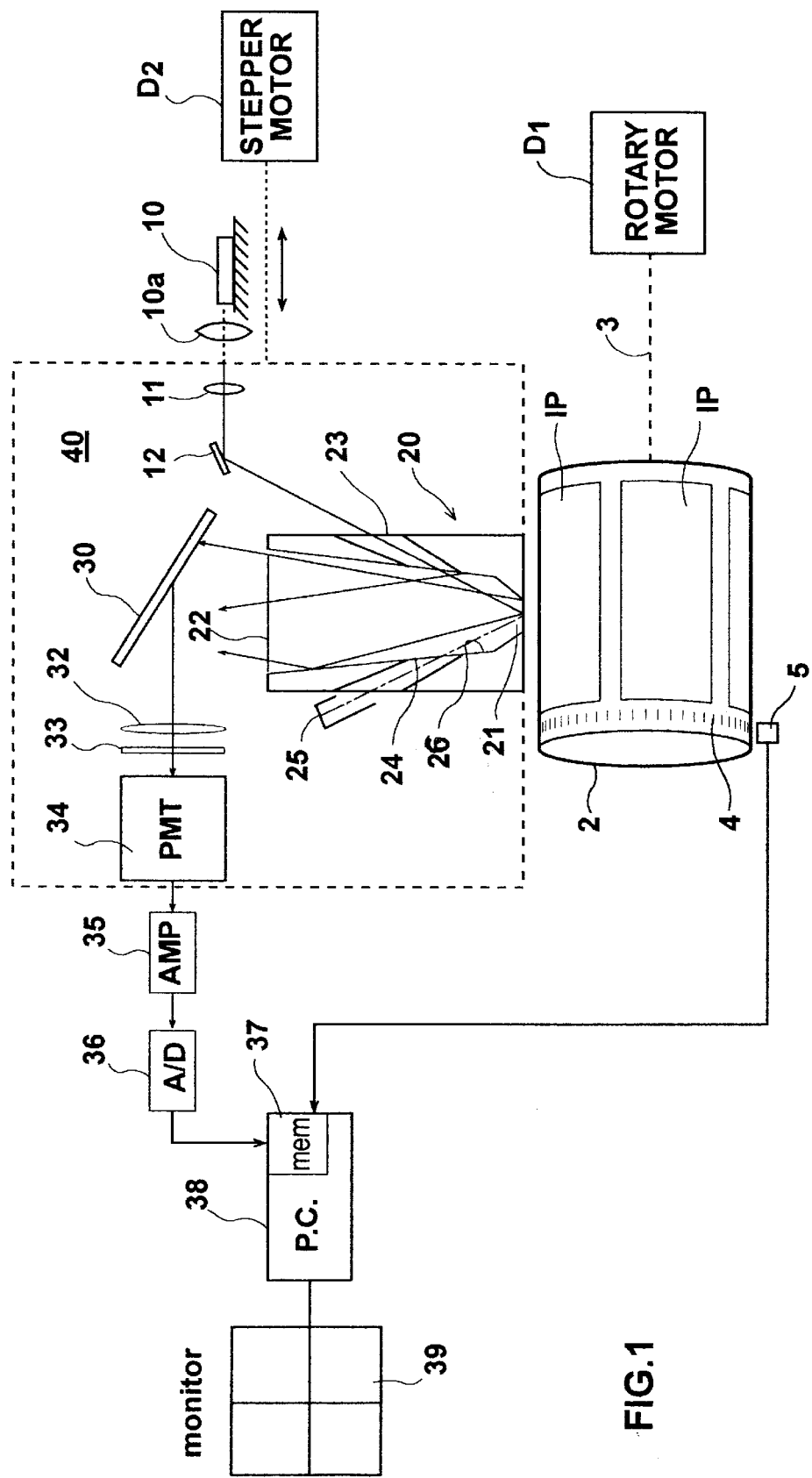
FIG. 1 is a schematical diagram illustrating one form of imaging plate reader constructed in accordance with the present invention.

The reader illustrated in FIG. 1 may be used to convert a standard film-type mammographic X-ray unit to an electronic digital system by using an imaging plate in place of the standard film-screen cassette. The imaging plate would be inserted into a thin light blocking envelope, which is then placed on the tray or shelf, otherwise used to support the film-screen cassette, with the emulsion side of the imaging plate facing the breast of the patient and the X-ray source vertically above it (or horizontally aligned with it). After exposure, the envelope with the imaging plate containing the latent image is taken to a nearly dark room where it is removed from the envelope and mounted on the mammographic imaging plate reader. The imaging plate reader may therefore be used as an accessory to an existing mammographic X-ray unit.

Briefly, the reader illustrated in FIG. 1 reads the latent images stored in photo-stimulated luminescence imaging plates IP by scanning the imaging plates with a focussed beam of red light (long wavelength) to stimulate the stored images to emit luminescent blue light (short wavelength); collecting the emitted light; and directing the collected light to a light detector which detects the collected light to electrical signals which are stored and processed in a computer. The present invention is concerned primarily with the collection system for collecting the light emitted from the imaging plate in a manner enabling the high requirements of sensitivity, contrast and spatial resolution of X-ray mammography to be attained.

In the reader illustrated in FIG. 1, a plurality (e.g., four) imaging plates IP are read at one time. For this purpose, the imaging plates are mounted on the outer surface of a drum 2 at different angular positions of the drum. The drum is rotated by a drive $D_1$ about rotary axis 3 such that a slice of each imaging plate IP is scanned during each rotation of the drum. Any suitable means may be used for mounting the imaging plates IP on drum 2, such as adhesive tape, suction, mechanical clips, or a combination of any of the above. Drum 2 is provided with a plurality of code markings 4 around its circumference (or with a separate encoder, not shown, coupled to the drum shaft) cooperable with a detector 5 to encode the various positions of the drum during its rotation, as will be described more particularly below.

The imaging plates IP are scanned with a focussed beam of light from a laser 10 outputting a beam of red light (short wavelength). The laser beam, after passing through a beam expander 10a, is focussed by a focussing lens 11 and is reflected by a mirror 12 onto the face of the imaging plates IP. In order to scan the complete surfaces of the imaging plates IP, drum 2 is continuously rotated by rotary drive $D_1$ while focussing lens 11, deflector mirror 12, and the light collector system for collecting the light from the imaging plates, are moved in unison parallel to the rotary axis 3 of the drum 2 by a stepper motor drive $D_2$. Beam expander 10a produces an expanded parallel beam of a diameter less than that of lens 11 such that changes in the distance between laser 10 and lens 11 will not affect the focussing of the beam onto the imaging plates IP via mirror 12.

The focussed beam of red light from laser 10 stimulates the latent image stored in the imaging plates to emit luminescent blue light. Lens 11 focusses the laser beam so that it illuminates the imaging plates IP with a spot of light approximately equal to the size of the pixels in the digitized image. The pixel size and the laser spot size may be determined according to the requirements for the particular application.

The light emitted from the imaging plates IP is collected by a non-imaging optical system. The main components of the optical system are a light collecting mirror 20 located adjacent to the imaging plates IP being scanned, and a dichroic mirror 30 at the outlet window of the collecting mirror 20.

The light collecting mirror 20 is of an octogonal, 2-stage pseudo-paraboloidal configuration or a similar approximation to a non-imaging light collection device. It is formed with an entrance aperture 21 sufficiently close to the imaging plates IP so as to collect all the light emitted by them when stimulated by the laser beam. Collecting mirror 20 further includes an outlet window 22 for outletting the collected light to the dichroic mirror 30; an inlet light opening 23 for directing the focussed scanning light beam from laser 10 onto the imaging plates at a predetermined angle of incidence (approximately 25° in this case); and a light dump opening 24 at a predetermined angle of reflection equal to the angle of incidence and leading to a black dump cavity 25 for receiving and absorbing specularly reflected light from the imaging plates. The inner surface of the light collecting mirror 20 includes a dichroic coating to selectively reflect to the output window 22 the blue light emitted from the imaging plates, and to transmit the red light diffusely reflected from the imaging plate.

It will thus be seen that the laser (red) light specularly reflected from the surface of the imaging plate is totally absorbed in the black dump cavity 25; whereas the laser beam light diffusively reflected (i.e., scattered) from the imaging plate is transmitted through the dichroic coating 26 on the inner surface of the collecting mirror, and therefore is also prevented from exiting via the outlet window 22. Accordingly, substantially all the light collected by collecting mirror 20 from the imaging plate is the photo-stimulated blue light which leaves collecting mirror 20 via the exiting window 22.

The photo-stimulated blue luminescence light exiting from outlet window 22 is directed towards dichroic mirror 30 which is arranged at a 45° angle to the axis of the outlet window 22 and to the imaging plate IP. Dichroic mirror 30 passes therethrough the red laser light. It reflects the blue luminescent light, which passes via focussing lens 32 and a blue-green filter 33 (blocking any remaining red light) to a photomultiplier tube light detector 34.

Lens 32 produces a broad beam of the blue light reflected from dichroic mirror 30 to fill the window of the photomultiplier tube so that its photocathode is nearly uniformly illuminated. Photomultiplier tube 34 has a wide dynamic range so as to be able to detect all useful levels of X-ray exposure on the imaging plate IP. The gain of the photomultiplier tube is electronically controlled. The electrical output of photomultiplier tube 34 is fed to an amplifier 35 which amplifies it linearly, logarithmically, or according to any compensation curve that might be executed by electronic means. The output of amplifier 35 is digitized in an analog-to-digital converter 36 which samples the amplifier output at intervals synchronized with the movement of the scanning beam by one pixel on the imaging plate. The digital information is stored in memory 37 of computer 38, and its output is viewed in monitor 39.

Computer 38 also receives rotary position signals of drum 2 by detector 5 which detects the code markings 4 on the drum (or on a shaft encoder, if used). The rotary position signals store the position of each pixel in the computer memory 37.

In order to increase the efficiency of the light collection from the imaging plates IP, the entrance aperture 21 of the collecting mirror 23 is located very closed to the imaging plates IP as they are rotated on the rotary drum 2. The laser 10 and its beam expander 10a are fixed, but collecting mirror 20 is mounted on a carriage 40, which also mounts the focussing lens 11, and deflector mirror 12 at the inlet side of the collecting mirror. Carriage 40 additionally mounts the dichroic mirror 30, lens 32, filter 33 and photomultiplier tube 34 at the outlet side of the collecting mirror. Accordingly, all the foregoing elements are moved in unison by the stepper motor $D_2$ during the rotation of the drum 2 while scanning the imaging plates IP.

The output power of laser 10 is sufficiently high to deplete the trapped electrons at each pixel site on the imaging plates in the time that the laser spot traverses a pixel. The specularly reflected laser light is directed to and is absorbed in dump cavity 25, whereas the diffusely scattered laser light passes through the dichroic coating 26 on the inner face of the collecting mirror 20, thereby preventing its return to the imaging plate. Accordingly, the light exiting from the outlet window 22 of the collecting mirror 20 will have a very high concentration of the blue luminescence light produced by the photo-stimulation of the imaging plate, and will be reflected by dichroic mirror 30 to the photomultiplier tube 34. The small content of red light in the light exiting from window 22 of collecting mirror 20 will be further separated from the blue light by dichroic mirror 30. Lens 32 concentrates the blue light reflected by dichroic mirror 30 uniformly over the photocathode of the photomultiplier tube.

The above-described reader thus collects and records the photo-stimulated luminescence short wavelength light with a very high efficiency to achieve a high signal-to-noise ratio of the recorded image.

When the reader is used with respect to imaging plates for X-ray mammography, the main contribution to image noise is the statistical fluctuation of the number of X-ray photons incident upon the imaging plate after passing through the breast of the patient and the supporting table apparatus of the mammography unit. The dynamic range of imaging plates is at least 100,000. Photomultiplier tube 34 can be one that reaches saturation at 1,000 times its dark current noise level for the signal bandwidth needed. Saturation in photomultiplier tubes may be controlled at the expense of gain. This is accomplished by reducing the voltage gradient in the latter stages of the tube which reduces electron multiplication. Any additional amplification of the output current may be accomplished by the amplifer circuit which processes the signal for the analog-to-digital converter. The full dynamic range of the imaging plate may be represented over the quantization range of the digitized signal. To retain accuracy, 12 or 16 bit quantization may be used.

Figure 2:
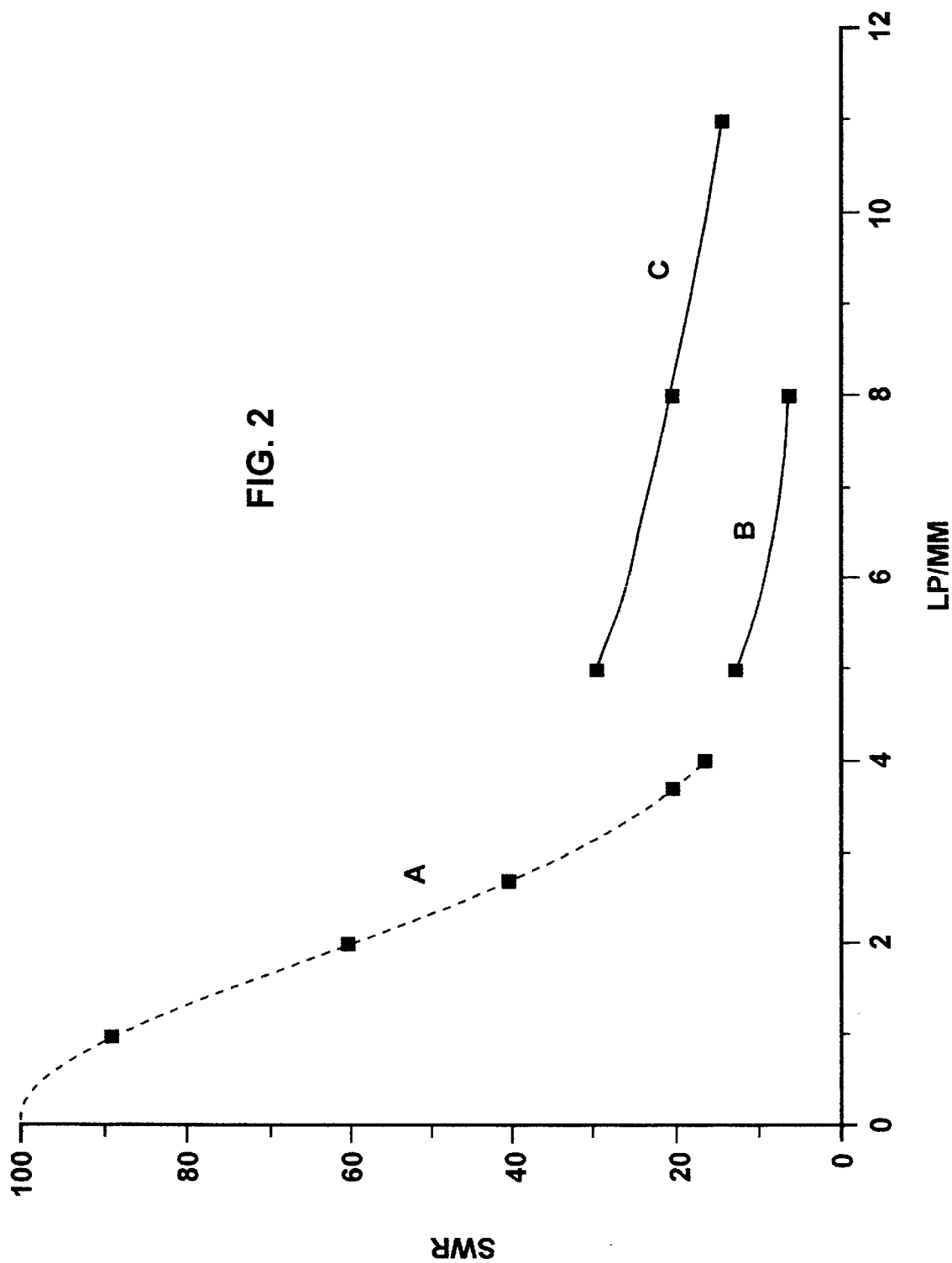
FIG. 2 includes a set of curves comparing the resolution performance of an imaging plate reader constructed in accordance with the present invention as described below, with the performance of an existing imaging plate reader.

An experimental imaging plate reader as illustrated in FIG. 1, and as described above, was constructed and was found to have a sufficiently high light collection efficiency to enable imaging plates to be used in X-ray mammography. FIG. 2 illustrates the results of the tests performed. The imaging plate was a BaFBr:EU phosphor screen on a flexible polymer sheet about 1 mm thick. When exposed to X-rays, the Eu ions in the phosphor are ionized, generating photo-electrons that become trapped at a BaFBr color center.

Resolution performance of an imaging system is specified by its MTF (modulation transfer function). An MTF gives the value of the amplitude of an output image modulation due to a spatially sinusoidal stimulus as a function of the spatial modulation frequency. Its value is expressed as a percent fraction of the amplitude obtained when the spatial frequency is essentially zero.

To test the resolution performance of the above-described imaging plate reader, imaging plates were exposed in a mammographic X-ray machine using a high contrast resolution phantom (Computerized Imaging Reference Systems, Inc. model 16) as an object. Fuji high resolution HR imaging plates were used.

The resolution phantom consisted of a nickel-gold alloy layer embedded in acrylic. The metallic layer had square wave bar patterns at frequencies from five to twenty line pairs per millimeter. Therefore the data actually represent the response to a square wave modulation rather than an MTF.

The square-wave response of Fuji HR plates read by a Fuji model FCR-AC-1 reader has been published by Fuji in specification documentation for the imaging plates. The square wave response (SWR) published by Fuji is reproduced as curve A in FIG. 2. The response is given only up to four line pairs per millimeter. As the pixel size was 100 microns, the response could not, in any event, be measured beyond 5 lp/mm.

A reader designed according to the present invention, and as illustrated in FIG. 1, was tested to obtain curve B which shows the SWR for HR plates up to 8 lp/mm. The pixel size used for these measurements was 25 microns. It is seen that the measurement using the new reader design joins the previously published curve and extends it to higher spatial frequencies.

Curve C shows the effective SWR after high pass frequency filtering and grey level balancing imaging processing techniques were applied to enhance the output image response. High contrast levels are obtained at high spatial frequencies.

These measurements show the quantitative performance advantages of the imaging plate reader as described above. These performance advantages enable the use of imaging plates in X-ray mammography.

Figure 3:
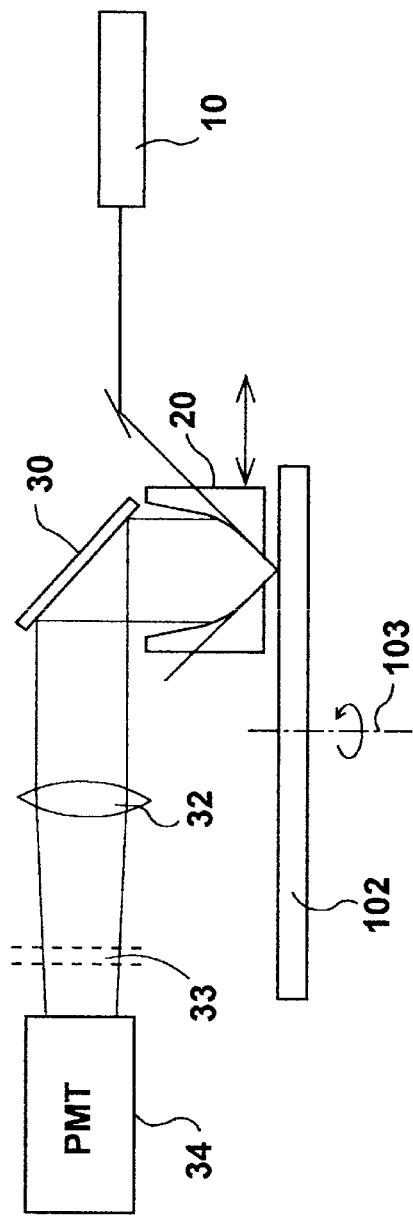
FIG. 3 illustrates another embodiment of the invention wherein the imaging plate reader includes a rotating disc, rather than a rotating drum as in the embodiment of FIG. 1.
Figure 4:
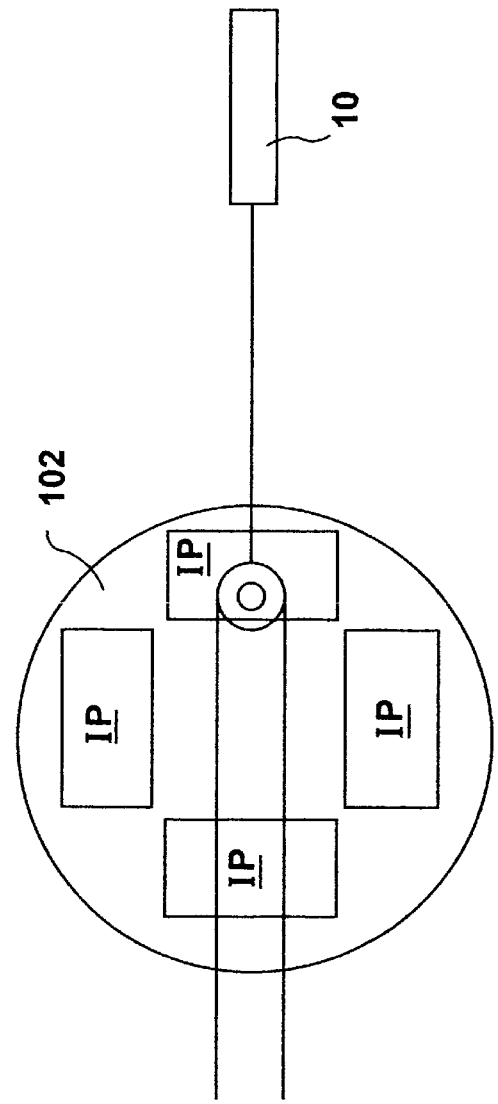
FIG. 4 is a top plan view of the rotating disc in the embodiment of FIG. 3.

FIGS. 3 and 4 illustrate another embodiment of the invention wherein the imaging plates IP are mounted on a rotary disc 102, rather than a rotary drive (2). The light scanning system and the light collecting system would therefore be driven incrementally in the radial direction, i.e., towards or away from the rotary axis 103, during the scanning of the imaging plates on disc 102. The reader illustrated in FIGS. 3 and 4 is otherwise of the same construction and involves the same basic operation as described above with respect to FIG. 1, and therefore the same reference numerals have been used to identify the corresponding elements.

Many other variations may be made. For example, the laser 10 used in scanning the imaging plates may also be mouned on carriage 40; also, it may be a diode laser rather than a helium-neon laser. In addition, the scanning beam and the light collecting optics may be stationary, and the imaging plate may be moved along the two orthogonal axes in order to completely scan them.

Many other variations, modifications and applications of the invention will be apparent.

What is claimed is:

1. A method of reading a latent image stored in a photo-stimulated luminescence imaging plate by:
    scanning the imaging plate with a focussed beam of light of a first wavelength to stimulate the stored image to emit light of a second wavelength;
    collecting the light emitted by said imaging plate;
    and directing said collected light to a light detector which converts said collected light to electrical signals;
    characterized in that said emitted light is collected by a non-imaging optical system which includes a dichroic mirror selectively directing light of said second wavelength to said light detector and light of said first wavelength away from said light detector;
    said non-imaging optical system further including a light collecting mirror between said imaging plate and said dichroic mirror, said light collecting mirror having:
        an entrance aperture sufficiently close to the imaging plate to collect substantially all the light emitted therefrom;
        an outlet window for outletting the collected light via said dichroic mirror to said light detector;
        a light inlet opening for directing the focussed scanning light beam onto the imaging plate at a predetermined angle of incidence;
        a light dump opening at a predetermined angle of reflection equal to said angle of incidence leading to a dump cavity for receiving and absorbing specularly reflected light from the imaging plate;
        and an inner surface reflecting to said output window light of said second wavelength emitted from said imaging plate.

2. The method according to claim 1, wherein said inner surface of said light collecting mirror selectively reflects to said output window light of said second wavelength emitted from said imaging plate, and transmits light of said first wavelength diffusely reflected from the imaging plate.

3. The method according to claim 1, wherein said light collecting mirror is of paraboloidal configuration.

4. The method according to claim 1, wherein the scanning of said imaging plate is effected by moving said imaging plate in a first direction while moving said collecting mirror, dichroic mirror, and light detector in unison in a second direction perpendicular to said first direction.

5. The method according to claim 4, wherein said collecting mirror, dichroic mirror and light detector are all mounted on a common carriage so as to move together in unison, and said carriage also mounts a focussing lens and a filter between the dichroic mirror and the light detector.

6. The method according to claim 5, wherein said light source is fixed and includes a beam expander between the light source and said focussing lens.

7. The method according to claim 5, wherein said imaging plate is continuously rotated in said first direction while said carriage is incrementally stepped in said second direction during the scanning of said imaging plate.

8. The method according to claims 5, wherein said imaging plate is mounted on a drum rotated about a rotary axis while said carriage is moved parallel to said rotary axis.

9. The method according to claim 8, wherein said carriage is moved a single stepped increment for each rotation of the drum.

10. The method according to claim 8, wherein a plurality of said imaging plates are mounted on said drum at different angular positions thereof such that a slice of each imaging plate is scanned during each rotation of the drum.

11. The method according to claim 5, wherein said imaging plate is mounted on a disc rotated about a rotary axis while said carriage is moved radially of said disc towards or away from said rotary axis.

12. The method according to claim 11, wherein said carriage is moved a single stepped increment for each rotation of the disc.

13. The method according to claim 11, wherein a plurality of said imaging plates are mounted on said disc at different angular positions thereof such that a slice of each of said imaging plates is scanned during each rotation of he disc.

14. The method according to claim 1, wherein said latent image is stored in the imaging plate as latent energy stored by trapped electrons, and said scanning beam is powered to substantially deplete the latent energy stored by the trapped electrons.

15. The method according to claim 1, wherein said light detector is a photomultiplier tube having a large dynamic range and also including a photocathode having a broad beam aperture to average fluctuations caused by photocathode surface variations.

16. The method according to claim 15, wherein the output of said photomultiplier tube is amplified, digitized, and stored in a memory of a computer.

17. The method according to claim 16, wherein the positions of said imaging plate during the scanning thereof are encoded as electrical signals which are fed to said computer and stored therein to identify the locations of the outputs of said photomultiplier tube stored in the memory of said computer.

18. The method according to claim 1, wherein said focussed beam of light is from a helium-neon laser.

19. The method according to claim 1, wherein said focussed beam of light is from a diode laser.

20. The method according to claim 1, wherein said dichroic mirror selectively reflects said light of second wavelength and transmits therethrough said light of the first wavelength.

21. The method according to claim 1, wherein said light of said first wavelength is red light, and said light of said second wavelength is blue light.

22. The method according to claim 1, wherein said imaging plate is an X-ray mammograph imaging plate.

23. Apparatus for reading a latent image stored in a photo-stimulated luminescence imaging plate including:
    a beam scanner for scanning the imaging plate with a focussed beam of light of a first wavelength to stimulate the stored image to emit light of a second wavelength;
    a light collector for collecting the light emitted by said imaging plate;
    and a light detector for receiving and converting said collected light to electrical signals;
    characterized in that said light collector includes a non-imaging optical system which includes a dichroic mirror selectively directing light of said second wavelength to said light detector and light of said first wavelength away from said light detector;

said non-imaging optical system further including a light collecting mirror between said imaging plate and said dichroic mirror, said light collecting mirror having:

an entrance aperture sufficiently close to the imaging plate to collect substantially all the light emitted therefrom;

an outlet window for outletting the collected light via said dichroic mirror to said light detector;

a light inlet opening for directing the focussed scanning light beam onto the imaging plate at a predetermined angle of incidence;

a light dump opening at a predetermined angle of reflection equal to said angle of incidence leading to a dump cavity for receiving and absorbing specularly reflected light from the imaging plate;

and an inner surface reflecting to said output window light of said second wavelength emitted from said imaging plate.

24. The apparatus according to claim 23, wherein said inner surface of said light collecting mirror selectively reflects to said output window light of said second wavelength emitted from said imaging plate, and transmits light of said first wavelength diffusely reflected from the imaging plate.

25. The apparatus according to claim 23, wherein said light collecting mirror is of paraboloidal configuration.

26. The apparatus according to claim 23, wherein said beam scanner includes a first drive for moving said imaging plate in a first direction, and a second drive for moving said collecting mirror, dichroic mirror and light detector together in unison in a second direction perpendicular to said first direction.

27. The apparatus according to claim 26, wherein said collecting mirror, dichroic mirror and light detector are all mounted on a common carriage moved by said second drive, and said carriage also mounts a focussing lens and a filter between the dichroic mirror and the light detector.

28. The apparatus according to claim 27, wherein said light source is fixed and includes a beam expander between it and the focussing lens.

29. The apparatus according to claim 27, wherein said first drive is a rotary drive for rotating said imaging plate, and said second drive is a stepped drive for stepping said carriage in increments during the scanning of said imaging plate.

30. The apparatus according to claim 27, wherein said imaging plate is mounted on a drum rotated by said first drive about a rotary axis, while said carriage is moved by said second drive parallel to said rotary axis.

31. The apparatus according to claim 30, wherein said second drive moves said carriage a single stepped increment for each rotation of the drum.

32. The apparatus according to claim 30, wherein said drive includes means for mounting a plurality of said imaging plates at different angular positions such that a slice of each imaging plate is scanned during each rotation of the drum.

33. The apparatus according to claim 27, wherein said imaging plate is mounted on a disc rotated by said first drive about a rotary axis, while said carriage is moved by said second drive radially of said disc towards or away from said rotary axis.

34. The apparatus according to claim 33, wherein said second drive moves said carriage a single stepped increment for each rotation of the disc.

35. The apparatus according to claim 33, wherein a plurality of said imaging plates are mounted on said disc at different angular positions thereof such that a slice of each of said imaging plates is scanned during each rotation of the disc.

36. The apparatus according to claim 23, wherein said latent image is stored in the imaging plate as latent energy stored by trapped electrons, and said scanning beam is a laser beam powered to substantially deplete the latent energy stored by the trapped electrons.

37. The apparatus according to claim 23, wherein said light detector includes a photomultiplier tube having a large dynamic range and also including a photocathode having a broad beam aperture to average fluctuations caused by photocathode surface variations.

38. The apparatus according to claim 37, wherein said apparatus further includes: a computer having a memory, an amplifier, and a digitizer for amplifying and digitizing the output of said photomultiplier tube and for storing same in said memory of the computer.

39. The apparatus according to claim 38, wherein said apparatus further includes an encoder for encoding the positions of said imaging plate during the scanning thereof, and for converting such positions into electrical signals which are fed to said computer and stored therein to identify the locations of the outputs of said photomultiplier tube stored in the memory of said computer.

40. The apparatus according to claim 23, wherein said light scanner includes a helium-neon laser.

41. The apparatus according to claim 23, wherein said light scanner includes a diode laser.

42. The apparatus according to claim 23, wherein said dichroic mirror is disposed at a 45° angle to said imaging plate and selectively reflects said light of second wavelength and transmits therethrough said light of the first wavelength.

43. The apparatus according to claim 23, wherein said light of said first wavelength is red light, and said light of said second wavelength is blue light.

44. The apparatus according to claim 23, wherein said imaging plate is an X-ray mammograph imaging plate.

* * * * *